United States Patent
Hellwig

(10) Patent No.: US 12,060,744 B2
(45) Date of Patent: Aug. 13, 2024

(54) CONFIGURATION OF AUTOMATIC FUNCTIONS FOR A DOOR

(71) Applicant: dormakaba Deutschland GmbH, Ennepetal (DE)

(72) Inventor: Alexander Hellwig, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 507 days.

(21) Appl. No.: 17/342,102

(22) Filed: Jun. 8, 2021

(65) Prior Publication Data
US 2021/0388662 A1 Dec. 16, 2021

(30) Foreign Application Priority Data
Jun. 15, 2020 (EP) ................................. 20180054

(51) Int. Cl.
*E05F 15/76* (2015.01)
*G01S 13/04* (2006.01)
(Continued)

(52) U.S. Cl.
CPC ............. *E05F 15/76* (2015.01); *G01S 13/04* (2013.01); *G05B 11/01* (2013.01); *H04L 67/34* (2013.01);
(Continued)

(58) Field of Classification Search
CPC ............... E05F 15/76; E05F 2015/763; E05F 2015/765; E05F 2015/767; G01S 13/04;
(Continued)

(56) References Cited

U.S. PATENT DOCUMENTS

2002/0175827 A1 11/2002 Klein et al.
2008/0092443 A1 4/2008 Herman et al.
(Continued)

FOREIGN PATENT DOCUMENTS

DE 102008022714 A1 11/2009
DE 102016207963 A1 11/2017

OTHER PUBLICATIONS

Dreyer et al. (WO 2019043084 A1) "Configuration of Entrance Systems Having One or More Movable Door Members" Date Published 2019-03-0 (Year: 2019).*
(Continued)

*Primary Examiner* — Jorge L Carrasquillo
(74) *Attorney, Agent, or Firm* — CANTOR COLBURN LLP

(57) ABSTRACT

A method for individually configuring at least one automatic function for a door, in particular in a publicly accessible area, with at least one electrically or electronically controllable actuator for performing the automatic function, includes the steps of receiving configuration information from an electronical device associated to an individual in an approach area of the door, configuring the automatic function based on received configuration information, and controlling the actuator for performing the at least one automatic function according to the configuration. Moreover, a door control device is used for electrically or electronically controlling at least one actuator for performing at least one automatic function of a door, in particular in a publicly accessible area.

11 Claims, 4 Drawing Sheets

(51) Int. Cl.
    *G05B 11/01*     (2006.01)
    *H04L 29/08*     (2006.01)
    *H04L 67/00*     (2022.01)
    *H04W 4/02*      (2018.01)
    *E05F 15/73*     (2015.01)
(52) U.S. Cl.
    CPC ....... *H04W 4/023* (2013.01); *E05F 2015/763* (2015.01); *E05F 2015/765* (2015.01); *E05F 2015/767* (2015.01); *E05Y 2400/40* (2013.01); *E05Y 2400/44* (2013.01); *E05Y 2400/454* (2013.01); *E05Y 2400/664* (2013.01); *E05Y 2900/132* (2013.01)
(58) Field of Classification Search
    CPC ........ G05B 11/01; H04L 67/34; H04W 4/023; E05Y 2400/40; E05Y 2400/44; E05Y 2400/454; E05Y 2400/664; E05Y 2900/132

USPC ....................................................... 318/286
See application file for complete search history.

(56) References Cited

U.S. PATENT DOCUMENTS

| | | |
|---|---|---|
| 2014/0361868 A1 | 12/2014 | Shiraishi et al. |
| 2018/0072535 A1 | 3/2018 | Hiltunen et al. |
| 2019/0284864 A1* | 9/2019 | Dreyer .................... E05F 15/73 |
| 2020/0102779 A1 | 4/2020 | Rabinowitz |
| 2020/0379938 A1* | 12/2020 | Poulsen ................ H04L 67/303 |
| 2021/0222479 A1* | 7/2021 | Dreyer .................... E05F 15/73 |

OTHER PUBLICATIONS

Ratti (WO 2018167659 A1) "An Interactive Building Management System" Date Published Sep. 20, 2018 (Year: 2018).*

* cited by examiner

| | |
|---|---|
| S100 | Detect approach to door |
| S110 | Reception device sending out request signal |
| S120 | Receive configuration information from electronic device |
| S130 | Configure automatic function |
| S140 | Control actuator based on configuration information |
| S150 | Transmit information to electronic device |
| S160 | Configure pre-set configuration information |

Fig. 3

| S110 | Reception device sending out request signal |
| --- | --- |

| S120 | Receive configuration information from electronic device |
| --- | --- |

| S130 | Configure automatic function |
| --- | --- |

| S140 | Control actuator based on configuration information |
| --- | --- |

| S150 | Transmit information to electronic device |
| --- | --- |

| S160 | Configure pre-set configuration information |
| --- | --- |

Fig. 4

CONFIGURATION OF AUTOMATIC FUNCTIONS FOR A DOOR

CROSS REFERENCE TO RELATED APPLICATIONS

This application claims priority to European Patent Application No. 20180054.7, filed on Jun. 15, 2020, the contents of which are hereby incorporated by reference in their entirety.

TECHNICAL FIELD

The present disclosure relates to a method for individually configuring at least one automatic function for a door, in particular in a publicly accessible area, with at least one electrically or electronically controllable actuator for performing the automatic function.

Moreover, the present disclosure relates to a door control device for the electric or electronic control of at least one actuator for performing at least one automatic function of a door, in particular in a publicly accessible area.

BACKGROUND

Doors with various automatic functions are known in the state-of-the-art. Said automatic functions are sometimes referred to as convenience functions. For example, the automatic functions relate to a retractable door threshold, a ramp or a drive of the door. Said automatic functions make it easier for individuals to actuate and to pass the door. For example, when the individual approaches, the drive can automatically open the door and then close again. Doors with such automatic functions are more and more used in publicly accessible areas, in particular for facilitating easier passing of the doors for individuals with physical restrictions.

Disadvantageous is that various individuals consider these automatic functions as not helpful or at least as limited helpful, because the automatic functions are configured for the largest possible number of individuals. Therefore, it is possible, for example, that for some individuals the door opens too late, whereas for other individuals, the door closes too fast, while they have not passed the door yet.

In principle, various types of electronic closing systems are known. For example, an optical recognition of individuals is known, for example. In this case, often configuration data are retrieved from a server for guaranteeing access. However, this is not helpful in publicly accessible areas, because the access should not really be limited. The basic idea for publicly accessible areas is exactly that any individual should be able to access said area. The door recognizing individuals or a recognizing system of individuals of the public area is often times prone to errors and, for example, difficult to use for reasons of protecting data privacy.

SUMMARY

Therefore, the present disclosure overcomes at least one above-described disadvantage, at least partially. In particular, the present disclosure performs a simple configuration of automatic functions of doors, in particular, in publicly accessible areas, and moreover to increase the ease of passing the doors.

The above advantage is achieved by providing a method having the features of claim 1. Further features and details of the disclosure result from the respective dependent claims, the description and the drawings.

In particular, the advantage is achieved by providing a method for individually configuring at least one automatic function for a door, in particular in a publicly accessible area, with at least one electrically or electronically controllable actuator for performing the automatic function, comprising the steps of receiving configuration information from an electronic device associated to an individual in an approach area of the door, configuring the automatic function based on received configuration information, and controlling the actuator for performing the at least one automatic function according to the configuration.

Moreover, the above advantage is achieved by providing a door control device having the features of claim 13. Further features and details of the disclosure result from the claims depending thereon, the description and the drawings.

In particular, the advantage is also achieved by providing a door control device for electrically or electronically controlling the at least one actuator for performing at least one automatic function of a door, in particular in a publicly accessible area, with a control unit, and a reception device for receiving configuration information from an electronic device associated to an individual in an approach area of the door, wherein the control unit is formed for controlling the at least one electrically or electronically controllable actuator, and the control unit is embodied for performing an individual configuration of the at least one automatic function based on received configuration information, and for controlling the at least one actuator for performing the automatic function according to the configuration.

Thus, the basic idea of the present disclosure is to respectively individually perform for each individual a configuration of the at least one automatic function. Thereby, being able to perform an adaptation of the at least one automatic function to the individual. The adaptation can be performed by means of configuration information from the electronic device associated to the individual for any automatic functions, in principle for any doors, which receive and are able to correspondingly process configuration information, for adapting the automatic functions.

In particular, the door control device is formed for performing the above method.

In this case, the term door is understood that the door allows access to the publicly accessible area, i.e. also for leaving the publicly accessible area. Thus, the door can comprise a casing and one or more door leaf/leaves. In principle, also several individual doors can be comprised, which are disposed in spatial vicinity, for example, for allowing access to different toilets. Furthermore, the door can be a revolving door or a sliding door.

Preferably, the door is an entry door to the publicly accessible area, i.e. the publicly accessible area is accessed and left again through the door.

For example, the automatic function can be a door actuation. Accordingly, for example, the actuator can be a door drive for opening and/or for closing the door, i.e. in general for moving a door leaf of the door. In this case, door actuation can be realized without the individual interacting with the door, or be started by the individual interacting with the door, for example in that the individual exerts a light pressure on the closed door, whereby the door recognizes an opening intention and automatically is opened further.

In particular, the actuator or the door drive can be disposed directly at or in the door leaf, at or in a wall, at or in a door casing or at or in the floor. Such a door drive can be in particular a mechanic, electric and/or an electro-mechanic and/or an electro-hydraulic and/or a pneumatic door drive, wherein electrically and/or electro-mechanically, electro-hydraulically and/or pneumatically generated auxiliary force can close and/or open the corresponding door leaf. In this case, the auxiliary force can be dimensioned such that the auxiliary force acts as assisting, this means the individual needs to exert a reduced force on his/her own for opening and/or closing the door. The auxiliary force can be dimensioned as well such that the auxiliary force automatically opens the door, this means that the individual does not need to exert any force on his/her own in addition to the auxiliary force. Preferably, the auxiliary force is adjustable, in particular as a function of the opening angle of the respective door leaf. Preferably, in the event of a failure of the auxiliary force, door drives operated with auxiliary force continue to fulfil the functions of a mechanical door drive, in particular the function of the automatic closing or opening of the door.

Preferably, door drives can include at least one safety device. In particular, the safety device can delimit the opening force and/or the opening speed and/or the closing force and/or the closing speed. In particular in addition or as an alternative, the safety device can monitor the pivoting range of the door leaf and trigger a safety function should an individual or an object get into the pivoting range of the door leaf. For example, a safety function can comprise stopping the door leaf, reducing the speed of the door leaf.

Preferably, these safety functions as well can be configured.

As an alternative, the automatic function can be a ramp, a door threshold, a selection of an access (barrier-free access or "normal" access) or a conditional door release. Accordingly, the actuator can be a drive for moving, respectively adjusting the ramp and/or the door threshold. Furthermore as an alternative, the actuator can be a drive for releasing and/or interlocking a single door.

The door control device can be integrally embodied with the automatic function. Then, the door control device can configure the integral automatic function. In addition, the door control device can configure further automatic functions. As an alternative, the door control device is provided independently of the automatic function, for example, as a separate structural unit, which is associated to the door.

In principle, the control unit is any data processing unit, in particular a controller, particularly preferred an embedded controller.

The reception device serves for receiving configuration information. Preferably, the reception device is embodied for bi-directional communication with the electronic device. Preferably, the reception device is embodied according to a short-range radio standard, for example, Bluetooth or wireless-LAN. As an alternative, the reception device can be embodied as an ultrasound signal reception device.

The reception device is connected to the control unit over a data interface. Received configuration information is transmitted from the reception device to the control unit over the data interface.

Configuration information is information associated to the individual, which reflects the preferences or particular requirements as to the automatic function of the door, for example approach speed, transit time, use of ramps or lowering a threshold. Configuration information is general information for configuring in principle any doors at any locations, i.e. the automatic function is not linked to certain doors.

Configuration information causes individual configuration for the individual, who carries the electronic device. The effect of the individual configuration can be embodied for a one time/several times actuation of the actuator for performing the at least one automatic function, or until the individual leaves the approach area or removes himself/herself from the door.

The electronic device associated to the individual can be a mobile phone, a tablet computer, a smart watch or any other device, which the individual usually carries along, and which allows for communication with the reception device so that the electronic device can transmit configuration information to the door control device. Configuration information is stored locally in the device and/or provided. Preferably, the individual can adapt configuration information by editing in the device. For this purpose, corresponding software, for example as an application, can be installed on the electronic device associated to the individual.

Configuring the automatic function based on received configuration information comprises determining and providing a set of configuration information with a set of single information values, which are usable for the automatic function. Thus, in a simple case, corresponding received configuration information can be directly taken as configuration. As an alternative, processing configuration information can be performed, as described in detail below.

Controlling the actuator for performing the at least one automatic function according to the configuration can comprise transmitting the configuration to the actuator so that, upon actuation according to the configuration, the same performs the automatic function. In this case, for example, the current of the actuator is controlled according to the configuration, i.e. a controller of the automatic function actuates the automatic function for example when correspondingly triggered by a sensor. Thus, the automatic function is performed autonomously.

In addition, it can be provided that the door control device transmits a start command to the actuator so as to realize an actuation of the automatic function.

As an alternative, the control unit can store the configuration and, for example, control current for actuating the actuator according to the configuration. Thus, controlling the actuator for performing the at least one automatic function according to the configuration relates to the door control device controlling the corresponding actuator. In this case, for example, the actuator can be embodied just as a motor and does not require a controller.

According to an advantageous further development of the disclosure, it can be provided that the method comprises a step of detecting an approach of an individual to the door, in particular entering an approach area of the door. Detecting an approach of the individual to the door can serve for starting reception of configuration information, for example, in that the reception device is being activated. Moreover, detecting the approach of the individual to the door can initially trigger sending a request signal to the reception device for then receiving configuration information. In this case, detecting the approach of the individual to the door is the precondition, for example, for receiving configuration information or for sending the request signal.

According to an advantageous further development of the disclosure, it can be provided that detecting an approach of an individual to the door comprises detecting the approach of the individual to the door based on sensor information of an approach detection device, in particular for monitoring the approach area. Correspondingly according to an advantageous further development of the disclosure, it can be provided that the door control device includes an approach detection device, in particular with an ultrasound sensor, an optical sensor, in particular a camera, a radiolocation sensor for radio-locating the device associated to the individual, an infrared sensor or a radio sensor for detecting an approach of the individual to the door. On the one hand, detecting an approach of the individual to the door can serve for starting the reception of configuration information, for example, in that the reception device is being activated. Moreover, detecting the approach of the individual to the door can initially trigger sending a request signal with the reception device for then receiving configuration information. In addition, detecting an approach of the individual to the door can serve for controlling the actuator for performing the at least one automatic function according to the configuration. Namely, initially configuration information is received, and then, depending on the position of the individual, the automatic function is started, for example, once it is detected that the individual within the approach area further approached the door.

According to an advantageous further development of the disclosure, it can be provided that detecting an approach of an individual to the door can comprise receiving a signal from the electronic device associated to the individual, in particular receiving configuration information from the electronic device associated to the individual. When using a communication standard with a limited range, such as short-range radio standard, such as Bluetooth or wireless LAN, the electronic device associated to the individual can detect the approach of the individual in that communication is enabled, because the reception device and the electronic device associated to the individual are within communication range to each other. In this case, for example, means can be adopted for adapting the transmission power for adapting the communication range in a desired way and for being able to perform said adaptation for different ambient conditions. In particular, receiving configuration information from the electronic device associated to the individual ensures that the approach relates to an individual, who desires corresponding configuration of the automatic function so that activation by other devices is prevented, which communicate according to the same standard.

According to an advantageous further development of the disclosure, it can be provided that the method comprises a step of sending out a request signal for causing the at least one electronic device associated to the individual to send out configuration information. Thereby, the door control device can cause the electronic devices in the approach area of the door to transmit configuration information to the door control device. Said implementation is particularly advantageous for the electronic devices, because they only have to send configuration information if needed, whereas otherwise they can be passive and just have to operate the receiver thereof. Thus, reducing the energy consumption of said devices. Usually, the door control device is connected to an electric supply line, so that sending the request signal does not cause any problems in terms of energy consumption. In particular, the reception device periodically sending the request signal ensures that, after reaching the approach area, the electronic devices directly transmit configuration information to the reception device of the door control device and the control unit is able to correspondingly control the actuator.

According to an advantageous further development of the disclosure, it can be provided that sending out a request signal comprises sending out the request signal with type information relating to a kind of the automatic function, and receiving configuration information from an electronic device associated to an individual in an approach area of the door comprises receiving configuration information depending on type information. Preferably, the electronic device only transmits configuration information, which relates to configuring the automatic function identified via type information. Accordingly, transmitting configuration information can be limited to such information, which is relevant for the present at least one automatic function of the door. Preventing unnecessary transmission of configuration information. This is particularly advantageous, if configuration information of the electronic device associated to the individual includes information for a plurality of different automatic functions. In this case, configuration information is associated to different type information. Also, the reception device can filter received configuration information depending on the kind of the automatic function based on type information.

According to an advantageous further development of the disclosure, it can be provided that receiving configuration information from an electronic device associated to an individual in an approach area of the door comprises receiving configuration information from a plurality of electronic devices respectively associated to one individual in the approach area, and configuring the automatic function based on the received configuration information comprises determining a configuration as a combination of configuration information from the plurality of electronic devices respectively associated to one individual in the approach area. Especially in publicly accessible areas, it is possible that a large number of individuals simultaneously or shortly one after the other enter said area so that the configuration of the at least one automatic function cannot always be performed individually for each individual, as otherwise overlapping could occur when using the automatic functions. For example, a slow walking individual can enter the approach area, so that in principle, the configuration of the automatic function can be performed. However, the configuration can be wrong, if, prior to reaching the door, another individual, for whom a differing configuration is to be performed, passes said slow walking individual. Combining configuration information of the individuals in the approach area can allow for performing an optimal combined configuration for these individuals.

According to an advantageous further development of the disclosure, it can be provided that determining a configuration as a combination of configuration information of the plurality of electronic devices respectively associated to one individual in the approach area comprises forming an average value of information values of configuration information, and/or determining a configuration as a combination of configuration information of the plurality of electronic devices respectively associated to one individual in the approach area comprises determining a maximum value or a minimum value of information values of configuration information, and/or determining a configuration as a combination of configuration information of the plurality of electronic devices respectively associated to an individual in the approach area comprises determining an information value of configuration information depending on a further configuration value. Thus, combining the configuration information of the individuals in the approach area can be realized in different ways. Forming an average value of information values of configuration information allows for partially considering and accommodating configuration wishes of all individuals. In particular, the average value is to be simply formed for information values in the shape numerical values. However, also in a discrete selection, additionally a numerical value can be associated to the discrete values for being able to form the average value. As an alternative, the combination of configuration information can be performed in that a maximum value or a minimum value is determined of individual information values of configuration information. Thus, it can be ensured that the configuration is suitable for all individuals. For example, in a configuration of an opening speed of the door, a maximum value can be selected so that fast walking individuals can pass the door without any problem at any time. Likewise, in a configuration of an opening speed of the door, a maximum value can be selected so that slow walking individuals can pass the door without any problem at any time. In other cases, a further configuration value can be considered for determining the information value. For example, the further configuration value assigns prioritization for configuration information for the individual, to whom a respective electronic device is associated. In particular, the further configuration value indicates, whether or not the individual has physical restrictions so that the configuration of said individual is to be preferred.

According to an advantageous further development of the disclosure, it can be provided that the method comprises a step of transmitting information, relating to a facility to which the door belongs, to the device associated to the individual, in particular a map, accessibility information, availability of offers of the facility or the like. Information relating to the facility can comprise, for example, contact information of individuals in the facility or mapping information of the facility. Thereby, enabling the individual to find his/her way around the facility. This is particularly advantageous, if the door is an access door to the facility, for example, a building entry door or a property access door. Information can be transmitted from the door control device to the electronic device via the reception device, i.e. over the same communication path. As an alternative, information is transmitted via another communication device from the door control device to the electronic device without affecting the operation of the reception device of the door control device and potentially preventing the reception of configuration information.

According to an advantageous further development of the disclosure, it can be provided that receiving configuration information from an electronic device associated to an individual in an approach area of the door comprises receiving addressing information of the electronic device, and the method comprises a step of transmitting addressing information with identification information of the automatic function and/or identification information of the door, which provides the automatic function, to a server for causing the server, based on identification information of the automatic function, to transmit information relating to an assigned facility, in particular a map, accessibility information, availability of offers of the facility or the like, to the electronic device with transmitted addressing information. Thus, initiating a transmission of information relating to the facility from the server to the electronic device associated to the individual. In this case in detail, transmitting information is in the domain of the server and of the electronic device associated to the individual. In principle in this case, any optional data connection can be used between the server and the electronic device associated to the individual, such as a mobile radio communication according to any of the known standards GSM, GPRS, UMTS, LTE or 5G. Thereby, in principle can be provided any size information in any way, without affecting the operation of the reception device and potentially preventing receiving configuration information.

According to an advantageous further development of the disclosure, it can be provided that the method comprises a step of transmitting server addressing information to the device associated to the individual, wherein server addressing information makes information available for the electronic device, information relating to a facility belonging to the door, in particular a map, accessibility information, availability of offers of the facility or the like. Thus, the electronic device can be used for actively initiating a transmission of information relating to the facility from the server. In this case in detail, transmitting information is in the domain of the electronic device associated to the individual and of the server. In this case in principle, any optional data connection can be used between the server and the electronic device associated to the individual, such as a mobile radio communication according to any of the known standards GSM, GPRS, UMTS, LTE or 5G. Thereby, in principle can be provided any size information in any way, without affecting the operation of the reception device and potentially preventing receiving configuration information.

According to an advantageous further development of the disclosure, it can be provided that, after controlling the actuator for performing the at least one automatic function according to the configuration, the method comprises a step of configuring the automatic function based on preset configuration information, in particular after completed one time or several time control of the actuator for performing the automatic function and/or if the individual leaves the approach area of the door and/or after a timer elapsed. Thus, the individual configuration of the respective automatic function can be performed for allowing the corresponding individual to comfortably use the door. Following thereafter, for allowing any individual to comfortably use the door, in particular an individual, who does not own an electronic device for transmitting configuration information, is established a pre-setting with preset configuration information for this individual, which for example is advantageous for average individuals. In this case, the configuration is established based on preset configuration information, if for example, the automatic function was actuated, for example, if the individual has stepped through the door, of after multiple actuations, for example depending on the automatic function. For example, the preset configuration is re-established after completed one time or several time control of the actuator for performing the automatic function. As an alternative or in addition, the preset configuration can be re-established, if the individual leaves the approach area of the door and/or after a timer elapsed, for example, after performing the configuration based on configuration information the electronic device associated to the individual received or after controlling the actuator for performing the at least one automatic function. Leaving the approach area of the door can be detected, for example, via a corresponding approach detection device, in particular for monitoring the approach area. As an alternative, leaving the approach area of the door can be detected, in that the electronic device associated to the individual moves out of the approach area, and, for example, a communication connection disconnects between the electronic device associated to the individual and the reception device.

According to an advantageous further development of the disclosure, it can be provided that the method comprises a step of forwarding configuration information for individually configuring at least one automatic function for at least one further door, in particular for forwarding configuration information to at least one downstream door. Thereby, configuration information can be forwarded from door to door, without having to perform a respective new query of the automatic function. If a plurality of individuals is in the area of the further door, if need be, additionally identification information can be queried from the electronic device associated to the individual so that configuration information, which was transmitted already ahead of time with the same identification information, can be activated for the further door. Thereby, being able to quickly perform the configuration of the at least one automatic function.

According to an advantageous further development of the disclosure, it can be provided that the door control device is embodied for electrically or electronically controlling a plurality of actuators for performing a plurality of automatic functions of a door, and the control unit is embodied for performing an individual configuration of the plurality of automatic functions each time based on partial information of received configuration information, and for controlling the plurality of actuators for performing the plurality of automatic functions according to the configuration based on partial information. In this case, configuration information is correspondingly associated, preferably based on type information relating to a type of automatic function. A simple configuration of a plurality of automatic functions can be performed.

BRIEF DESCRIPTION OF THE DRAWINGS

Further advantages, features and details of the disclosure result from the following description, in which are described in detail exemplary embodiments of the disclosure, reference being made to the drawings. In this case, the features mentioned in the claims and in the description can be essential to the disclosure individually or in any arbitrary combination. It shows:

DETAILED DESCRIPTION OF THE DRAWINGS

Figure 1:
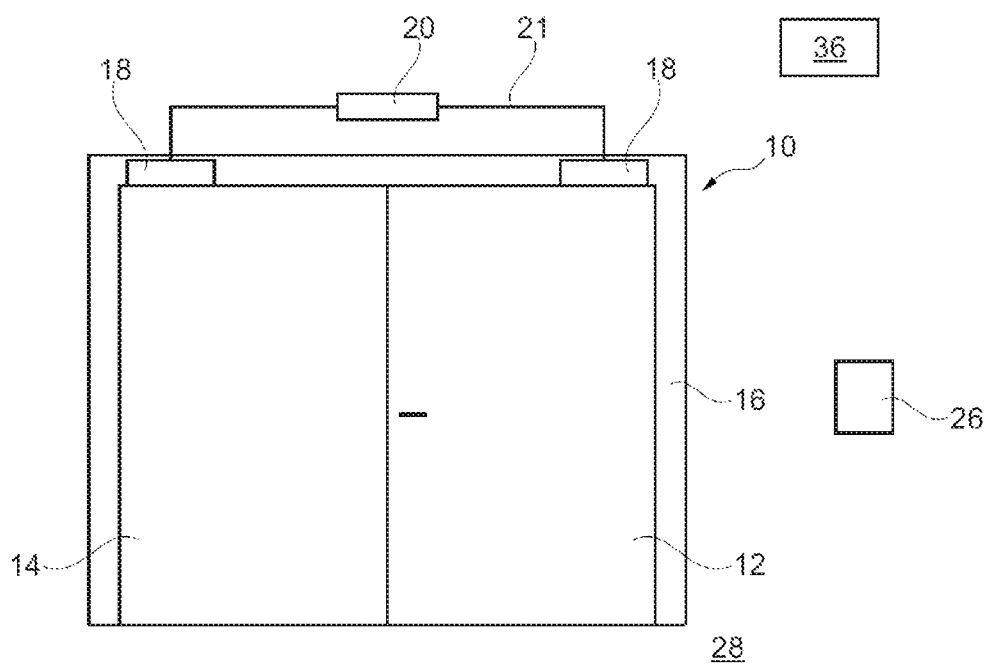
FIG. 1 an illustration of a door with two door leaves and two actuators for actuating the two door leaves together with an inventive door control device, as well as an electronic device and a server, FIG. 2 a detailed diagrammatic illustration of the door control device of FIG. 1, FIG. 3 a flow chart of a method for individually configuring an automatic function for the door of FIG. 1, according to a first preferred embodiment, and FIG. 4 a flow chart of a method for individually configuring an automatic function for the door of FIG. 1, according to a second embodiment.

In the following Figures identical reference numerals are used for the same technical features in different exemplary embodiments.

FIG. 1 diagrammatically illustrates a door 10. By way of example herein, the door 10 is used as an access door to a publicly accessible area.

The door 10 comprises an active leaf 12 and an inactive leaf 14, which both are retained pivotally at a door casing 16.

The inactive leaf 12 and the active leaf 14 are respectively connected to the door casing 16 via an actuator 18. In this exemplary embodiment, the actuators 18 are drives for opening and/or closing the respective door leaf 12, 14. In detail, the actuators 18 are embodied as mechanic, electric, electro-mechanic or electro-hydraulic drives so that the respective door leaf 12, 14 can be opened and/or closed by means of mechanic, electric, electro-mechanic or electro-hydraulic auxiliary force. In a way not illustrated herein, the actuators 18 can be respectively connected to an electric supply line. As an alternative, one or more energy accumulator/s can supply energy to the actuators.

A door control device 20, which, in this exemplary embodiment, is disposed in an area above the door casing 16, is associated to the door 10. In another exemplary embodiment, the door control device 20 can be mounted to or in the door casing 16, for example. The door control device 20 is electrically connected to both actuators 18 via a connecting line 21, as an alternative also wirelessly. As an alternative, the door control device 20 can be disposed as well at or in at least one of the actuators 18.

The door control device 20 is embodied for electrically or electronically controlling the actuators 18 for opening and/or for closing the two door leaves 12, 14 of the door 10. Thereby providing an automatic function for opening and/or closing the door 10.

Figure 2:
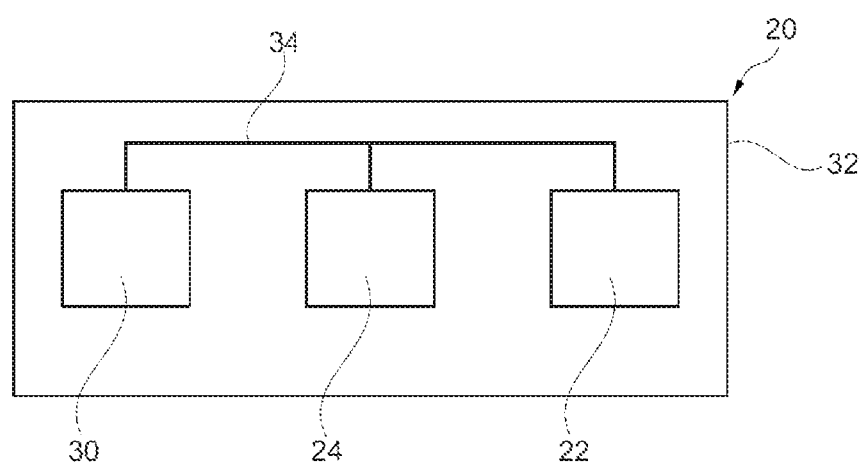

FIG. 2 shows the door control device 20 in detail. The door control device 20 comprises a control unit 22 and a reception device 24 for receiving configuration information from an electronic device 26 associated to the individual in an approach area 28 of the door 10, as illustrated in FIG. 1 by way of example. In principle, the control unit 22 is any data processing unit, in particular a controller, particularly preferred an embedded controller. The reception device 24 is embodied for bi-directional communication with the electronic device 26. The reception device 24 and the electronic device 26 are embodied for communication according to a short-range radio standard, in this exemplary embodiment according to Bluetooth standard.

Moreover, the door control device 20 comprises an approach detection device 30, which in this exemplary embodiment is embodied as an ultrasound sensor. In an alternative embodiment, the approach detection device 30 is embodied according to a type of motion sensor, an optical sensor, in particular a camera, radiolocation sensor for radio-locating the electric device 26, an infrared sensor or a radio sensor.

The reception device 24 and the approach detection device 30 are connected to the control unit 22 via a data interface 34.

The door control device 20 comprises a housing 32, in which the control unit 22, the reception device 24 and the approach detection device 30 are disposed together. In a way not illustrated herein, the door control device 20 is connected to an electric supply line. In an alternative embodiment, the door control device 20 is embodied integrally with the automatic function, i.e. one of the actuators 18 or both are disposed in a shared housing 32 of the door control device 20.

The electronic device 26 is a mobile device and as such associated to a carrier, typically an individual. Herein by way of example, the electronic device 26 is a mobile phone, which an individual carries along. The electronic device 26 is embodied for communication according to the Bluetooth standard and thus can communicate wirelessly with the reception device 24.

Configuration information is locally stored in the electronic device 26. Preferably, the individual himself/herself can adapt configuration information by editing in the electronic device 26. For this purpose, corresponding software, for example as an application can be installed on the electronic device 26 associated to the individual.

Configuration information is information associated to the individual, which reflects the preferences or particular requirements as to the automatic function of the door 10, for example approach speed, transit time, use of ramps or lowering a threshold. Configuration information is general information for configuring in principle any doors 10 in principle at any locations, i.e. the automatic function is not linked to specific doors 10.

Configuration information causes an individual configuration for the individual, who carries along the electronic device 26. The effect of the individual configuration can be embodied for a one time/several time control of the actuator 18 for performing the at least one automatic function, or until the individual leaves the approach area 28 or removes himself/herself from the door 10.

In the following is described a first exemplary embodiment of a method for individually configuring the automatic function of the door 10 for opening and/or closing the active leaf 12. The method is performed with the above-described door control device 20, and described based on the flowchart of FIG. 3.

The method starts with step S100, which comprises detecting an approach of an individual to the door 10, in particular entering the approach area 28 of the door 10. Detecting an approach of the individual to the door 10 activates the reception device 24 for receiving configuration information from the electronic device 26, as explained in detail hereafter.

Detecting the approach of the individual is performed with the approach detection device 30, which sent out ultrasound signals and recognizes movement in the approach area 28 from ultrasound echoes, which the individual generates as a response to the ultrasound impulses the approach detection device 30 sent out. In this case, the ultrasound echoes represent sensor information of the approach detection device 30.

Upon recognizing the approach of an individual, the data interface 34 transmits a corresponding signal to the control unit 22.

Step S110 relates to the reception device 24 sending out a request signal. The control unit 22 sends a corresponding signal to the reception device 24 via the data interface 34, which signal initiates sending out the request signal.

Sending out the request signal is realized with type information relating to a kind of the automatic function of the door 10. After activation in step S100, the reception device 24 periodically sends out the request signal.

The request signal causes the electronic device 26, which is located in the approach area 28, to send out stored configuration information for transmission to the reception device 24. In this case, only configuration information is transmitted, which relates to configuring the automatic function identified via type information. In this case, configuration information of the electronic device 26 is associated to various type information.

Step S120 relates to the reception device 24 receiving configuration information from the electronic device 26. In accordance with configuration information transmitted from the electronic device 26, which relates to the configuration of the automatic function identified via type information, said configuration information is received at the reception device 24 and forwarded to the control unit 22 via the data interface 34.

Moreover, receiving configuration information from the electronic device 26 ends that the reception device 24 is periodically sending out the request signal.

Step S130 relates to configuring the automatic function based on received configuration information. In the present exemplary embodiment, the configuration is performed in that the part of configuration information, which relates to the corresponding automatic function, is taken as the configuration for the actuator 18 of the active leaf 12.

Step S140 relates to controlling the actuator for preforming the automatic function according to the configuration. Configuration information, which is the basis for the configuration of the actuator 18, is transmitted to the actuator 18 over a connection line 21. When actuated, the actuator 18 can autonomously perform the automatic function based on transmitted configuration information. For this purpose, another sensor, which actuates the actuator 18 for actuating the automatic function, can be associated to the actuator 18. As an alternative, the actuator 18 is directly actuated, for example by the transmitting configuration information.

Step S150 relates to transmitting to the electronic device 26 information relating to a facility, to which the door 10 belongs. For example, said information comprises a map, accessibility information, availability of offers of the facility or the like. In this exemplary embodiment, information is directly transmitted from the reception device 24 of the door control device 20 to the electronic device 26.

In principle, step S150 can be realized independently of the previous steps, for example already directly following step S120 or at any following point in time.

Instead of transmitting information directly from the door control device 20 to the corresponding electronic device 26 in step S150, as an alternative, it can be provided, that the door control device 20 transmits server addressing information to the electronic device 26 associated to the individual, wherein server addressing information makes information, relating to the facility to which the door 10 belongs as explained above, available for the electronic device 26. For example, server addressing information can be embodied according to the type of an Internet address (URL). The electronic device 26 can actively use server addressing information for initiating a transmission of information relating to the facility from a server 36. In this case in principle, any data connection can be used between the server 36 and the electronic device 26, such as a mobile radio communication according to any of the known standards GSM, GPRS, UMTS, LTE or 5G depending on the specification of the electronic device 26.

Instead of transmitting information directly from the door control device 20 to the electronic device 26 in step S150, in an alternative embodiment, information, relating to the facility to which the door 10 belongs, can be directly transmitted from the server 46 to the electronic device 26. For this purpose, it is just required that, upon reception of the request message in step S110, the electronic device 26 with configuration information thereof sends out addressing information, which the door control device 20 receives, once the electronic device is in the approach area 28 of the door 10. The door control device 20 extracts addressing information from configuration information and transmits to the server 36 said information together with identification information of the door 10, which provides the automatic function. Receiving said information causes the server 36 to perform a transmission of information to the electronic device 26 with transmitted addressing information. Hereby as well in principle, any data connection can be used between the server 36 and the electronic device 26, such as a mobile radio communication according to any of the known standards GSM, GPRS, UMTS, LTE or 5G.

Step S160 relates to configuring the automatic function based on preset configuration information according to a completed one time control of the actuator 18 for performing the automatic function. This is approximated by an elapsed timer. The timer is started in step S140.

In the following is described a second exemplary embodiment of a method of individually configuring the automatic function of the door 10 for opening and/or closing the active door leaf 12. The method is likewise performed with the above-described door control device 20, and described based on the flowchart of FIG. 4. In this case, similar or identical steps are only explained in detail as far as they differ from the method of the first exemplary embodiment. If in doubt, details not indicated correspond to those of the method of the first exemplary embodiment.

The method of the second exemplary embodiment starts with step S110. According to step S110, the reception device 24 is periodically sending out the request signal.

Sending out the request signal is realized just as for the method of the first exemplary embodiment, with type information relating to a kind of the automatic function of the door 10.

The request signal causes electronic devices 26 located in the approach area 28 to send out stored configuration information thereof for transmission to the reception device 24. In this case, only configuration information is transmitted, which relates to configuring the automatic function identified via type information. In this case, configuration information of each electronic device 26 is associated to various type information.

Step S120 relates to the reception device 24 receiving configuration information from each electronic device 26. The reception device 24 receives and forwards configuration information to the control unit 22 via the data interface 34.

In the second exemplary embodiment, the reception device 24 periodically sending out the request signal does not end, but continues.

Step S130 relates to configuring the automatic function based on received configuration information. In the present exemplary embodiment, the configuration is performed in that the part of configuration information, which relates to the corresponding automatic function, is taken as the configuration for the actuator 18 of the active leaf 12.

As soon as configuration information is received from a further electronic device 26, is realized a combination of configuration information of the individuals in the approach area 28, i.e. is realized a combination of configuration information from the electronic devices 26, which are associated to the corresponding individuals and which the individuals carry along. As soon as an individual, respectively the electronic device 26 the individual carries along, leaves the approach area 28, corresponding configuration information is not considered any more, so that combining configuration information is not required any more. Leaving the approach area 28 can be approximated by an elapsed timer, which is started upon receiving configuration information and is associated to said configuration information.

For example, combining configuration information of the plurality of electronic devices 26 can comprise forming an average value of information values of configuration information, in that for example an average opening speed is determined from individual information values for a desired opening speed of the door 10 and is used as the configuration value.

As an alternative, a maximum value or a minimum value of individual information values of configuration information can be determined as the configuration value. Thereby for example, being able to determine a maximum or minimum opening speed from individual information values for a desired opening speed of the door 10 and to use as the configuration value.

Furthermore as an alternative, can be determined as the configurations value an information value depending on a further configuration value. The further configuration value indicates for example a prioritization for configuration information of an electronic device 26, in particular whether or not the individual, who carries along the corresponding electronic device 26, has physical restrictions so that configuration information thereof is to be preferred.

Step S140 relates to controlling the actuator 18 for preforming the automatic function according to the configuration. In this case, configuration information corresponds to configuration information of a single electronic device 26 or to combined configuration information determined as indicated above. Corresponding configuration information is transmitted to the actuator 18 over the connection line 21. Then, the actuator 18 can autonomously perform the automatic function based on transmitted configuration information. For this purpose, another sensor can be associated to the actuator 18, which sensor actuates the actuator 18 for performing the automatic function.

In this case, transmitting configuration information to the actuator 18 is realized each time the configuration changes, i.e. if an individual with an electronic device 26 enters or leaves the approach area 28.

Step S150 relates to transmitting to the electronic device 26 information relating to a facility, to which the door 10 belongs, as described above.

Step S160 relates to configuring the automatic function based on preset configuration information, as described above with regard to the method of the first exemplary embodiment.

The above explanation of the embodiments describes the present disclosure exclusively based on examples. Obviously, individual features of the embodiments, as long as they are technically reasonable, may be freely combined with each other without departing from the scope of the present disclosure.

The invention claimed is:

1. A method for individually configuring at least one automatic function for a door, in a publicly accessible area, with at least one electrically or electronically controllable actuator for performing the automatic function, the method including the following steps:
   receiving configuration information from an electronic device associated to an individual in an approach area of the door,
   configuring the automatic function based on received configuration information, and controlling the actuator for preforming the at least one automatic function according to the configuration,
   detecting an approach of an individual to the door entering an approach area of the door, wherein detecting the approach is based on sensor information of an approach detection device for monitoring the approach area, and includes receiving both a signal from the electronic device associated to the individual and configuration information from the electronic device associated to the individual, and
   transmitting information relating to a facility to which the door belongs to the device associated to the individual, a map, accessibility information, availability of offers of the facility.

2. The method according to claim 1,
   wherein
   the method further includes a step of sending out a request signal for causing the at least one electronic device associated to the individual to send out configuration information.

3. The method according to claim 2,
   wherein sending out a request signal comprises sending out the request signal with type information relating to a kind of the automatic function, and receiving configuration information from an electronic device associated to an individual in an approach area of the door comprises receiving configuration information depending on the type information.

4. The method according to claim 1, wherein receiving configuration information from an electronic device associated to an individual in an approach area of the door comprises receiving configuration information from a plurality of electronic devices associated to one respective individual in the approach area, and configuring the automatic function based on received configuration information comprises determining a configuration as a combination of configuration information from the plurality of electronic devices associated to one respective individual in the approach area.

5. The method according to claim 4, wherein determining a configuration as a combination of configuration information from the plurality of electronic devices associated to one respective individual in the approach area comprises forming an average value of information values of configuration information, and/or determining a configuration as a combination of configuration information from the plurality of electronic devices associated to one respective individual in the approach area comprises determining a maximum value or a minimum value of information values of configuration information, and/or determining a configuration as a combination of configuration information from the plurality of electronic devices associated to one respective individual in the approach area comprises determining an information value of configuration information depending on a further configuration value.

6. The method according to claim 1, wherein receiving configuration information from an electronic device associated to an individual in an approach area of the door comprises receiving addressing information of the electronic device, and the method further includes a step of transmitting to a server addressing information with identification information of the automatic function and/or identification information of the door which provides the automatic function, for causing the server, based on identification information of the automatic function, to transmit information, relating to an assigned facility, a map, accessibility information, availability of offers of the facility, to the electronic device with transmitted addressing information.

7. The method according to claim 1, wherein after controlling the actuator for performing the at least one automatic function according to the configuration, the method further includes a step of configuring the automatic function based on preset configuration information, after completed one time or several time control of the actuator for performing the automatic function and/or if the individual leaves the approach area of the door and/or after a timer elapsed.

8. The method according to claim 1, wherein the method further includes a step of forwarding configuration information for individually configuring at least one automatic function for at least one further door, for forwarding configuration information to at least one downstream door.

9. A door control device for electrically or electronically controlling at least one actuator for performing at least one automatic function of a door, in a publicly accessible area, the door control device comprising:

a control unit; and a reception device for receiving configuration information from an electronic device associated to an individual in an approach area of the door, wherein the control unit is embodied for controlling the at least one electrically or electronically controllable actuator, and the control unit is embodied for performing an individual configuration of the at least one automatic function based on received configuration information, and for controlling the at least one actuator for performing the automatic function according to the configuration, an approach detection device configured for detecting an approach of an individual to the door entering the approach area, wherein detection is based on sensor information for monitoring the approach area, and includes receiving both a signal from the electronic device associated to the individual and configuration information from the electronic device associated to the individual, and information relating to a facility to which the door belongs is transmitted to the device associated to the individual, a map, accessibility information, availability of offers of the facility.

10. The door control device according to claim 9, wherein the approach detection device includes an ultrasound sensor, an optical sensor, a camera, a radiolocation sensor for radio-locating the device associated to the individual, an infrared sensor or a radio sensor for detecting the approach of the individual to the door.

11. The door control device according to claim 9, wherein the door control device is embodied for the electric or electronic control of a plurality of actuators for performing a plurality of automatic functions of a door, and the control unit is embodied for performing an individual configuration of the plurality of automatic functions respectively based on partial information of received configuration information, and for controlling the plurality of actuators for performing the plurality of automatic functions according to the configuration based on partial information.

* * * * *